US011531252B2

(12) United States Patent
Suto et al.

(10) Patent No.: US 11,531,252 B2
(45) Date of Patent: Dec. 20, 2022

(54) VEHICLE AND IMAGING DEVICE

(71) Applicant: HONDA MOTOR CO., LTD., Tokyo (JP)

(72) Inventors: Masaki Suto, Tokyo (JP); Tomoya Hagihara, Tokyo (JP); Tatsuya Yamasaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/590,955

(22) Filed: Feb. 2, 2022

(65) Prior Publication Data

US 2022/0252962 A1 Aug. 11, 2022

(30) Foreign Application Priority Data

Feb. 9, 2021 (JP) ............................. JP2021-019215

(51) Int. Cl.
*G03B 15/03* (2021.01)
*B60Q 3/70* (2017.01)
*B60Q 3/14* (2017.01)

(52) U.S. Cl.
CPC ............... *G03B 15/03* (2013.01); *B60Q 3/14* (2017.02); *B60Q 3/70* (2017.02)

(58) Field of Classification Search
CPC ............. G03B 15/03; B60Q 3/14; B60Q 3/70
See application file for complete search history.

(56) References Cited

U.S. PATENT DOCUMENTS

2019/0098185 A1* 3/2019 Kadomae ............... G03B 15/03

FOREIGN PATENT DOCUMENTS

| JP | 2010-269736 A | 12/2010 |
| JP | 2011-042179 A | 3/2011 |
| JP | 2018-062299 A | 4/2018 |
| JP | 2019-014361 A | 1/2019 |

OTHER PUBLICATIONS

Japanese Office Action for Japanese Patent Application No. 2021-019215 dated Jun. 17, 2022 (partially translated).
Japanese Office Action for Japanese Patent Application No. 2021-019215 dated Sep. 16, 2022 (partially translated).

* cited by examiner

*Primary Examiner* — Thomas M Sember
(74) *Attorney, Agent, or Firm* — Thomas | Horstemeyer, LLP (57) ABSTRACT

A vehicle comprises: an imaging unit configured to image an occupant from front of the occupant in a vehicle longitudinal direction in a vehicle interior; and a light emitting unit including a first light emitting portion and a second light emitting portion configured to irradiate an imaging range of the imaging unit. An optical axis of irradiation light from the first light emitting portion and an optical axis of irradiation light from the second light emitting portion intersect with each other between the light emitting unit and the occupant in plan view.

9 Claims, 5 Drawing Sheets

VEHICLE AND IMAGING DEVICE

CROSS-REFERENCE TO RELATED APPLICATION(S)

This application claims priority to and the benefit of Japanese Patent Application No. 2021-019215 filed on Feb. 9, 2021, the entire disclosure of which is incorporated herein by reference.

BACKGROUND OF THE INVENTION

Field of the Invention

The present invention relates to a vehicle and an imaging device.

Description of the Related Art

A device for imaging an occupant in a vehicle interior of a vehicle is known. Japanese Patent Laid-Open No. 2019-14361 discloses an occupant imaging device in which a camera lens is arranged on an instrument panel is provided with a light emitting portion for illuminating an occupant being an imaging target.

SUMMARY OF THE INVENTION

According to an embodiment of the present invention, a vehicle comprises: an imaging unit configured to image an occupant from front of the occupant in a vehicle longitudinal direction in a vehicle interior; and a light emitting unit including a first light emitting portion and a second light emitting portion configured to irradiate an imaging range of the imaging unit, wherein an optical axis of irradiation light from the first light emitting portion and an optical axis of irradiation light from the second light emitting portion intersect with each other between the light emitting unit and the occupant in plan view.

According to another embodiment of the present invention, an imaging device comprises: an imaging unit configured to image an occupant from a front in a vehicle longitudinal direction in a vehicle interior; and a light emitting unit including a first light emitting portion and a second light emitting portion configured to irradiate an imaging range of the imaging unit from the front in the vehicle longitudinal direction, wherein an optical axis of irradiation light from the first light emitting portion and an optical axis of irradiation light from the second light emitting portion intersect with each other between the light emitting unit and the occupant in vehicle plan view.

DESCRIPTION OF THE EMBODIMENTS

There is a case of performing processing such as recognition or state detection of an occupant based on an image captured by an imaging device. From the viewpoint of processing accuracy and the like, it is desirable that the occupant is reliably irradiated by a light emitting portion, and for this reason, it is desirable that the light emitting portion is provided so as to increase an irradiation range.

Embodiments of the present invention provide a technique for increasing an irradiation range of a light emitting portion.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In addition, in each figure, an X direction indicates a front-and-rear direction of a vehicle V, a Y direction indicates a vehicle width direction of the vehicle V, and a Z direction indicates a vertical direction. In addition, in the present specification, expressions such as front/rear, left/right (lateral), upper/lower, and the like indicate a relative positional relationship with respect to the vehicle body, and for example, expressions such as front, forward, and the like correspond to the +X direction and expressions such as rear, rearward, and the like correspond to the −X direction. In addition, for example, expressions such as left, leftward, and the like correspond to the +Y direction, and expressions such as right, rightward, and the like correspond to the −Y direction. Similarly, expressions such as the inside of the vehicle body, the outside of the vehicle body (inside and outside of the vehicle), and the like indicate a relative positional relationship with respect to the vehicle body.

<Outline of Vehicle>

Figure 1:
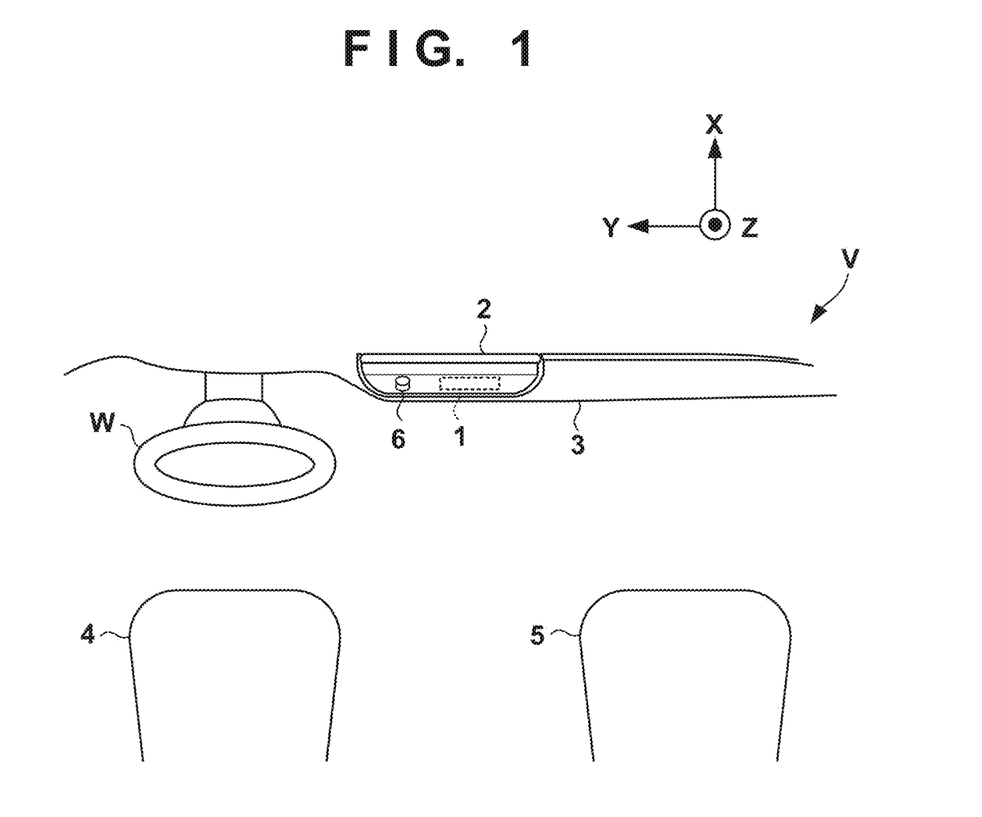
FIG. 1 is a plan view schematically illustrating a vehicle interior of a vehicle.

FIG. 1 is a plan view schematically illustrating a vehicle interior of a vehicle V and is a view particularly illustrating a configuration of a front portion of the vehicle V. The vehicle V is provided with a driver seat 4 and a passenger seat 5. In addition, a steering wheel W is provided in front of the driver seat 4.

The vehicle V includes an instrument panel 3. The instrument panel 3 is a panel that is provided at the front portion of the vehicle V, specifically, in front of the driver seat 4 and the passenger seat 5, and on the panel, various components are arranged. The instrument panel 3 may be referred to as a dashboard. An imaging device 1 and a display unit 2 are arranged at the center portion of the instrument panel 3 in the vehicle width direction. The imaging device 1 is a device that images an occupant seated on the driver seat 4 or the passenger seat 5. In addition, the display unit 2 is, for example, a liquid crystal panel or an organic electroluminescent (EL) panel, and displays various types of information such as map information, route information, or the like. In addition, instruments, an air conditioner, or the like can be arranged on the instrument panel 3. In addition, in the present embodiment, the instrument panel 3 is provided with an operation unit 6 for operation of components of the vehicle V. For example, the operation unit 6 may allow adjustment of the volume of the speaker, setting of the air volume of the air conditioner, or the like.

<Configuration of Imaging Device>

Figure 2:
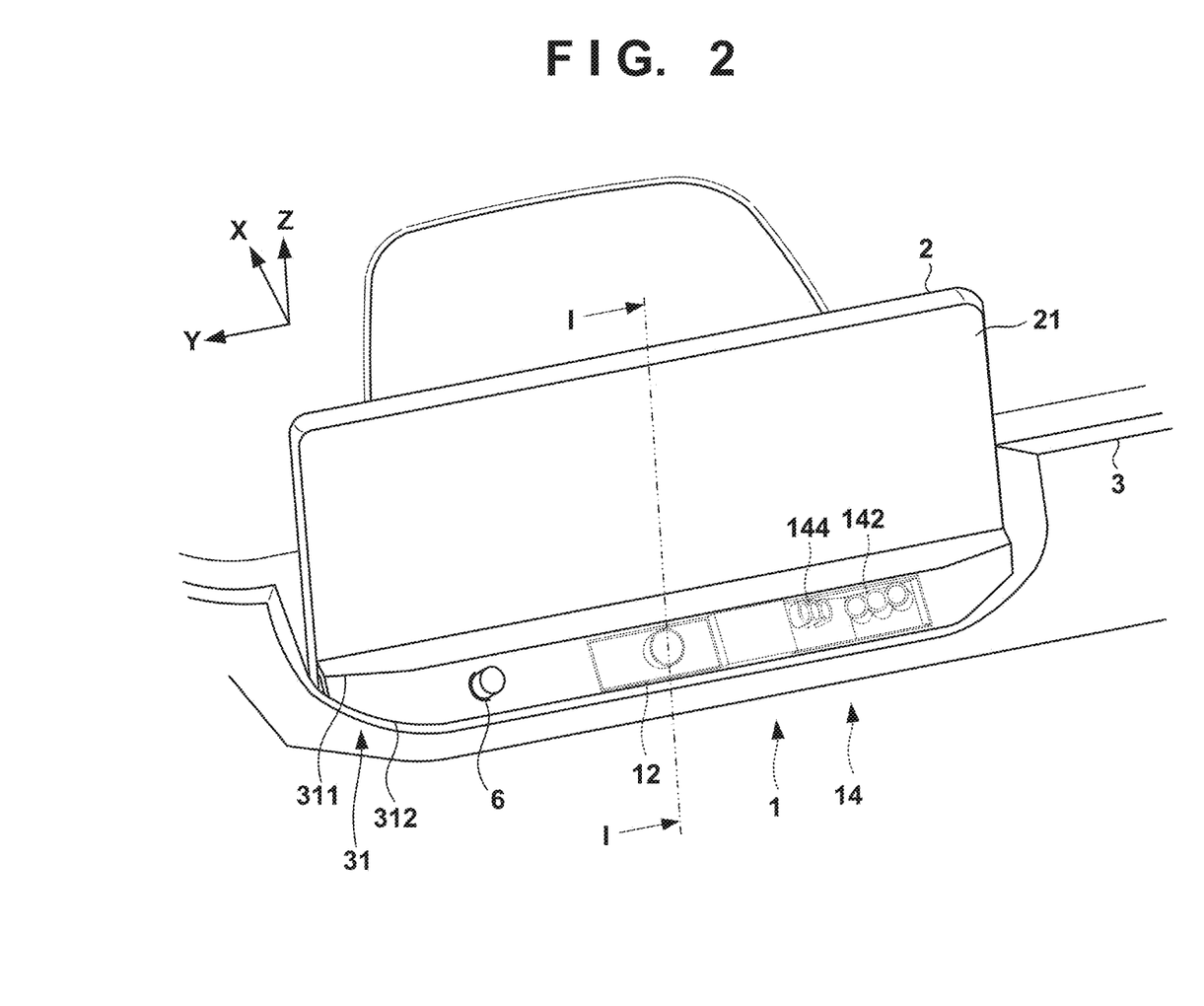
FIG. 2 is a perspective view for explaining a configuration around an imaging device and a display unit.
Figure 3:
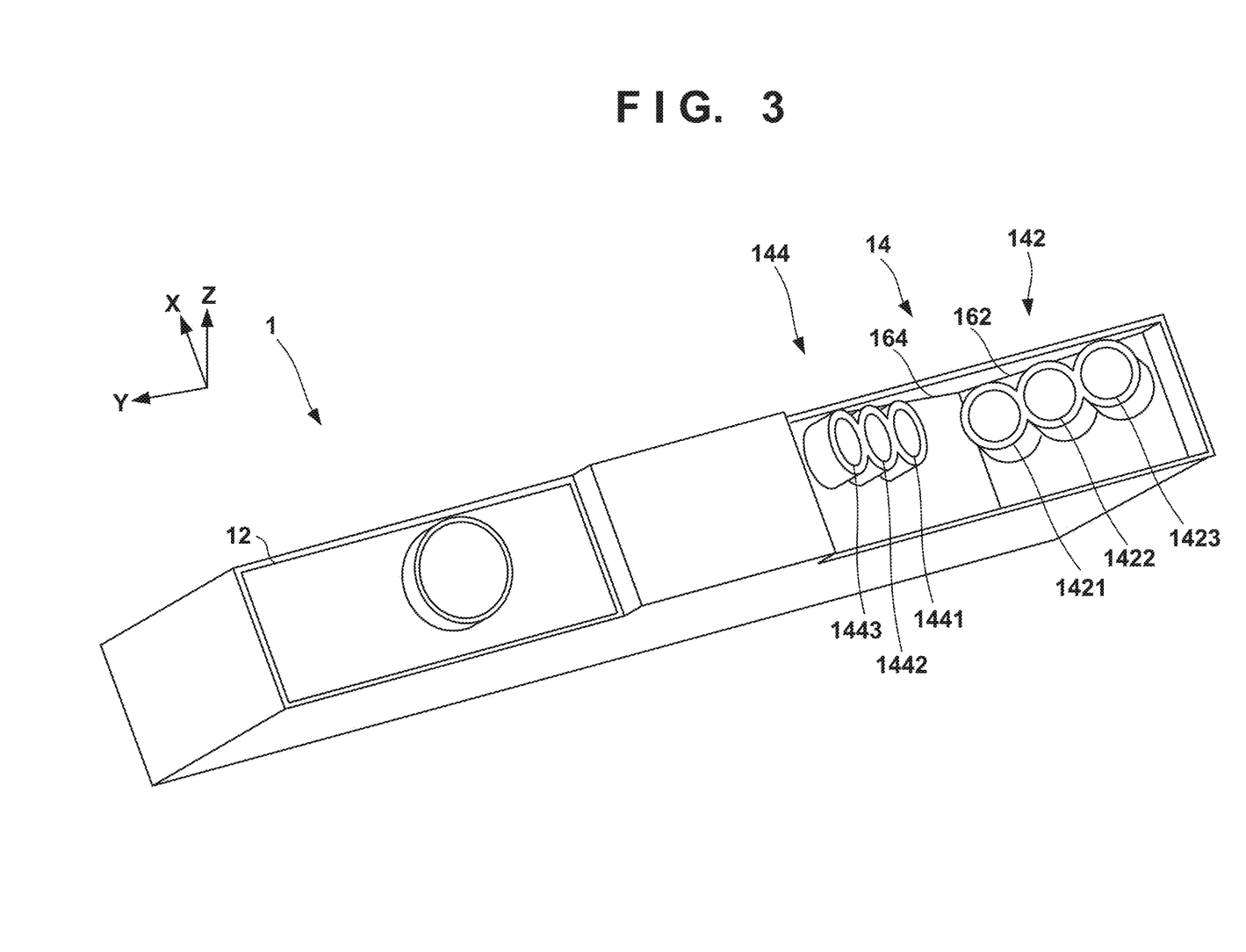
FIG. 3 is a perspective view schematically illustrating a configuration of an imaging unit.

FIG. 2 is a perspective view for explaining a configuration around the imaging device 1 and the display unit 2. In addition, FIG. 3 is a perspective view schematically illustrating a configuration of the imaging device 1. In the present embodiment, the imaging device 1 is provided below the display unit 2.

The imaging device 1 is a device that images an occupant in the vehicle interior of the vehicle V. The image captured by the imaging device 1 may be used, for example, for user authentication, detection of an occupant state, or the like. In the present embodiment, the imaging device 1 is provided inside the instrument panel 3. For example, the imaging device 1 is supported by a bracket (not illustrated in the figures) or the like provided in the instrument panel 3. In addition, the imaging device 1 is provided being covered with a cover portion 31 included in the instrument panel 3 (see <Configuration of Cover Portion>). The imaging device 1 includes an imaging unit 12 and a light emitting unit 14.

The imaging unit 12 is, for example, a camera, and is a unit capable of imaging an occupant from the front of the occupant in the vehicle longitudinal direction in the vehicle interior. In the present embodiment, the imaging unit 12 is arranged below the display unit 2 and substantially at the center of the vehicle in the vehicle width direction and images the occupant seated on the driver seat 4 or the passenger seat 5. For example, the imaging unit 12 is provided so that its optical axis directs rearward and upward so as to enable imaging around the face of the occupant seated on the driver seat 4 or the passenger seat 5 from the front. In addition, as specifically illustrated in FIG. 5, the imaging unit 12 images the occupant through a rear side portion 312 of the cover portion.

Figure 4:
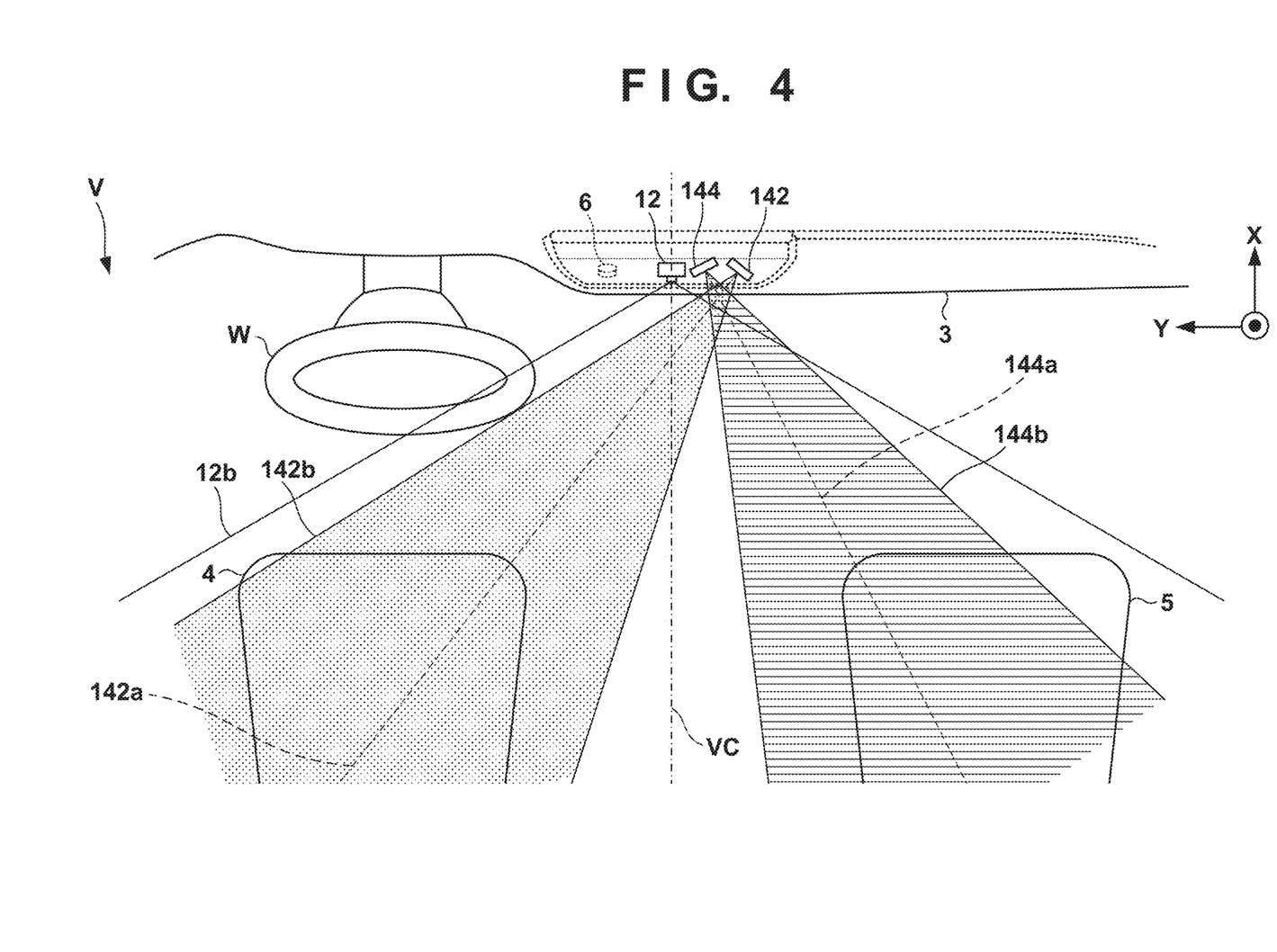
FIG. 4 is a plan view illustrating an imaging range of the imaging unit and an irradiation range of a light emitting portion.

As specifically illustrated in FIG. 4, the light emitting unit 14 is a unit that irradiates an imaging range 12b of the imaging unit 12. Specifically, the light emitting unit 14 irradiates the imaging range 12b of the imaging unit 12 so as to irradiate around the face of the occupant seated on the driver seat 4 or the passenger seat 5. As specifically illustrated in FIG. 4, the light emitting unit 14 includes a light emitting portion 142 that emits the irradiation light having the optical axis directed toward the driver seat 4 and a light emitting portion 144 that emits the irradiation light having the optical axis directed toward the passenger seat 5. That is, in the imaging range 12b of the imaging unit 12, a portion on the driver seat 4 side is irradiated by the light emitting portion 142, and a portion on the passenger seat 5 side is irradiated by the light emitting portion 144. In addition, in terms of a positional relationship in plan view, the light emitting portion 142 and the light emitting portion 144 are separated in the vehicle width direction, and the light emitting portion 142 is provided on the driver seat 4 side and the light emitting portion 144 is provided on the passenger seat 5 side in the vehicle width direction.

In the present embodiment, attachment faces 162 and 164 forming valley-shaped inclinations are formed in the imaging device 1, and the light emitting portions 142 and 144 are attached to the attachment faces 162 and 164, respectively, thereby defining the orientation directions of the irradiation light from the light emitting portions 142 and 144. Here, the attachment face 162 is provided such that a surface normal thereof directs toward the driver seat 4, more specifically, directs left rearward and upward. In addition, the attachment face 164 is provided such that a surface normal thereof directs toward the passenger seat 5, more specifically, directs right rearward and upward. As a result, an optical axis 142a of the irradiation light from the light emitting portion 142 attached to the attachment face 162 is directed to the driver seat 4, and an optical axis 144a of the irradiation light from the light emitting portion 144 attached to the attachment face 164 is directed to the passenger seat 5.

In addition, the light emitting portion 142 includes a plurality of light emitters 1421 to 1423, and the light emitting portion 144 includes a plurality of light emitters 1441 to 1443. The light emitters 1421 to 1423 and 1441 to 1443 may be, for example, light-emitting diodes (LEDs).

In the present embodiment, the light emitters 1421 to 1423 are provided side by side in a direction orthogonal to the direction of the optical axis 142a of irradiation light from each of the light emitters 1421 to 1423. In addition, the light emitters 1441 to 1443 are provided side by side in a direction orthogonal to the direction of the optical axis 144a of irradiation light from each of the light emitters 1441 to 1443 (see FIG. 4). By providing a plurality of light emitters in each of the light emitting portions 142 and 144, it is possible to more reliably irradiate the occupant. Note that the number of light emitters of the light emitting portions 142 and 144 is an example, and the light emitting portions 142 and 144 each may have two or less or four or more light emitters. In addition, the light emitting portion 142 and the light emitting portion 144 may have different numbers of light emitters. For example, the number of light emitters of the light emitting portion 142 whose optical axis is directed toward the driver seat 4 may be larger than the number of light emitters of the light emitting portion 144 whose optical axis is directed toward the passenger seat 5.

<Arrangement Mode of Light Emitting Unit>

FIG. 4 is a plan view illustrating the imaging range 12b of the imaging unit 12 and irradiation ranges 142b and 144b of the light emitting portions 142 and 144. Note that, although the light emitting portions 142 and 144 respectively include a plurality of light emitters 1421 to 1423 and 1441 to 1443, in FIG. 4, optical axes and irradiation ranges of the light emitters 1422 and 1442 at the center are illustrated as representatives thereof in order to make the figure easily viewable. In addition, the irradiation ranges 142b and 144b exemplarily indicate regions within an angle of a directional angle (sometimes referred to as a half-value angle or a half-luminescence angle) of the irradiation light from light emitters 1422 and 1442.

As described above, it is desirable that the occupants, more specifically, the faces of the occupants, are reliably irradiated by the light emitting portions 142 and 144 from the viewpoint of processing accuracy such as user authentication, detection of an occupant state, or the like using the image captured by the imaging unit 12. Therefore, in the present embodiment, an arrangement mode of the light emitting unit 14 as described below is adopted.

That is, in the present embodiment, the light emitting unit 14 is arranged such that the optical axis 142a of the irradiation light from the light emitting portion 142 and the optical axis 144a of the irradiation light from the light emitting portion 144 intersect with each other between the light emitting unit 14 and the occupant in the vehicle V plan view. Since the light emitting portion 142 and the light emitting portion 144 are arranged such that the optical axis 142a and the optical axis 144a intersect with each other, the irradiation distance that is the distance at which the irradiation light from each of the light emitting portions 142 and 144 reaches the occupant tends to be long. As the irradiation distance increases, the spread of the irradiation range in the direction orthogonal to the optical axis direction increases. Therefore, the irradiation ranges 142b and 144b of the light emitting portions 142 and 144 can be made larger.

In addition, the position of the face of the occupant seated on the driver seat 4 or the passenger seat 5 can vary depending on the position of the seat in the front-and-rear direction, the occupant's physical status, or the like. However, in the present embodiment, since the irradiation ranges 142*b* and 144*b* of the light emitting portions 142 and 144 are increased, the position of the face of the occupant is easily irradiated by the light emitting portions 142 and 144 even if the position of the face of the occupant varies.

In addition, in the present embodiment, as a specific configuration for the optical axes 142*a* and 144*a* to intersect with each other, the light emitting portions 142 and 144 are attached to the attachment faces 162 and 164 forming valley-shaped inclinations, respectively. As a result, the optical axis 142*a* of the light emitting portion 142 is formed to advance to the left side (+Y direction) as advancing rearward of the vehicle (−X direction) in vehicle V plan view. On the other hand, the optical axis 144*a* of the light emitting portion 144 is formed to advance to the right side (−Y direction) as advancing rearward of the vehicle (−X direction) in vehicle V plan view. With such an arrangement mode, the optical axes 142*a* and 144*a* of the light emitting portions 142 and 144 intersect with each other between the light emitting unit 14 and the occupant.

In addition, in the present embodiment, the attachment faces 162 and 164 forming the valley-shaped inclinations are provided so as to form a recess recessed to the front side in the vehicle longitudinal direction with respect to other components of the imaging device 1. As a result, the light emitting portions 142 and 144 can be prevented from protruding to the rear side of the vehicle V, and interference or the like between the light emitting unit 14 and other components can be suppressed.

In addition, in the present embodiment, since the light emitting unit 14 is provided at a portion recessed to the front side in the vehicle longitudinal direction with respect to other components of the imaging device 1, the rear end thereof is located on a front side with respect to the rear end of the imaging unit 12 in the vehicle longitudinal direction. Accordingly, the light emitting unit 14 is arranged so as to be accommodated in the instrument panel 3. Thus, it is possible to reliably irradiate the imaging target with the irradiation light while reducing noise from surrounding electrical components.

Note that advancing directions of the optical axes 142*a* and 144*a* can be set as appropriate. In the present embodiment, in vehicle V plan view, the optical axis 142*a* advances toward the left rear, and the optical axis 144*a* advances toward the right rear. However, one of the optical axes 142*a* and 144*a* may advance substantially parallel to the vehicle longitudinal direction, both the optical axes 142*a* and 144*a* may advance right rearward, or both may advance left rearward. That is, the advancing directions of the optical axes 142*a* and 144*a* can be set such that the optical axes 142*a* and 144*a* intersect with each other between the light emitting unit 14 and the occupant.

Note that the arrangement of the light emitting unit 14 is not limited to the mode of the present embodiment. For example, a light emitting portion that emits the irradiation light having the optical axis directed to the driver seat 4 may be provided on the −Y side of the imaging unit 12, and a light emitting portion that emits the irradiation light having the optical axis directed to the passenger seat 5 may be provided on the +Y side of the imaging unit 12. That is, two light emitting portions may be arranged on the left and right of the imaging unit 12 and may be provided so that the optical axes thereof intersect with each other before reaching the occupant.

In addition, in the present embodiment, the optical axis 142*a* of the irradiation light from the light emitting portion 142 is directed to the driver seat 4, and the optical axis 144*a* of the irradiation light from the light emitting portion 144 is directed to the passenger seat 5. As a result, the irradiation ranges 142*b* and 144*b* of the irradiation light directed to each of the driver seat 4 and the passenger seat 5 can be further increased.

Note that, as an example of a case where the optical axis 142*a* of the light emitting portion 142 is directed to the driver seat 4, there is a case where the optical axis 142*a* passes through the driver seat 4 in vehicle V plan view. As another example, there is a case where at least a part of the driver seat 4 overlaps with a region within an angle of the directional angle of the light emitter of the light emitting portion 142 in vehicle V plan view. Similarly, as an example of a case where the optical axis 144*a* of the light emitting portion 144 is directed to the passenger seat 5, there is a case where the optical axis 144*a* passes through the passenger seat 5 in vehicle V plan view. As another example, there is a case where at least a part of the passenger seat 5 overlaps with a region within an angle of the directional angle of the light emitter of the light emitting portion 144 in vehicle V plan view.

In addition, in the present embodiment, the light emitting portion 142 that emits the irradiation light having the optical axis 142*a* directed to the driver seat 4 is provided at a position farther from the driver seat 4 than the center of the vehicle V. Specifically, the light emitting portion 142 is provided on the passenger seat 5 side with respect to a vehicle center line VC illustrated in FIG. 4. It is considered that the occupant in the driver seat 4 has a higher priority of processing such as user authentication, detection of an occupant state, or the like than the occupant in the passenger seat 5. In the present embodiment, since the light emitting portion 142 that emits the irradiation light having the optical axis 142*a* directed toward the driver seat 4 is arranged farther from the driver seat 4, the irradiation distance of the light emitting portion 142 becomes longer, and the irradiation range 142*b* of the light emitting portion 142 directed toward the driver seat 4 can be made larger.

In addition, in the present embodiment, the light emitting unit 14 is provided at a position farther from the driver seat 4 than the imaging unit 12 in the vehicle width direction. As a result, the light emitting unit 14 is arranged farther from the driver seat 4. Therefore, the irradiation range 142*b* of the irradiation light directed to the driver seat 4 can be further increased. In addition, since the light emitting portions 142 and 144 of the light emitting unit 14 are collectively arranged not on both sides but one side of the imaging unit 12, the light emitting unit 14 can be downsized, and electrical wiring and the like thereof can be simplified.

In addition, in the present embodiment, the imaging unit 12 is arranged such that the vehicle center line VC, which is a virtual straight line extending in the front-and-rear direction at the center in the vehicle width direction, passes through the imaging unit 12 in plan view of the vehicle V. As a result, the imaging unit 12 is arranged substantially at the center of the vehicle V in the vehicle width direction. As a result, the imaging unit 12 can image both the occupant in the driver seat 4 and the occupant in the passenger seat 5.

In addition, as illustrated in FIG. 2, in the present embodiment, the operation unit 6 is provided to protrude rearward in the vehicle longitudinal direction from the instrument panel 3 and is arranged so as to be located closer to the driver seat 4 than the imaging unit 12. As a result, the operation unit 6 is provided on the side close to the driver seat 4, and thus the driver can easily operate the operation unit 6. In addition, since the imaging unit 12 is provided at a position between the operation unit 6 and the light emitting unit 14, a distance between the operation unit 6 and the light emitting unit 14 can be secured, and the light emitted from the light emitting unit 14 to the side of the driver seat 4 can be prevented from being blocked by the portion protruding rearward from the operation unit 6.

Note that, in the present embodiment, the imaging device 1 is provided below the display unit 2, but may be provided at another position. For example, the imaging device 1 may be provided around a rearview mirror or the like. That is, the arrangement of the light emitting unit 14 in the vertical direction is not particularly limited as long as the optical axes 142*a* and 144*a* of the light emitting portions 142 and 144 intersect with each other between the light emitting unit 14 and the imaging target in plan view.

In addition, in the present embodiment, the vehicle center line VC passes through the imaging unit 12 in plan view of the vehicle V. However, the imaging unit 12 may be arranged on the driver seat 4 side with respect to the vehicle center line VC, or may be arranged on the passenger seat 5 side. For example, the imaging unit 12 is provided on the driver seat 4 side with respect to the vehicle center line VC, so that the driver can be imaged from a position closer to the front. As a result, it is easy to authenticate the face of the driver considered to have a high priority of processing such as user authentication, detection of an occupant state, or the like.

<Configuration of Cover Portion>

Figure 5:
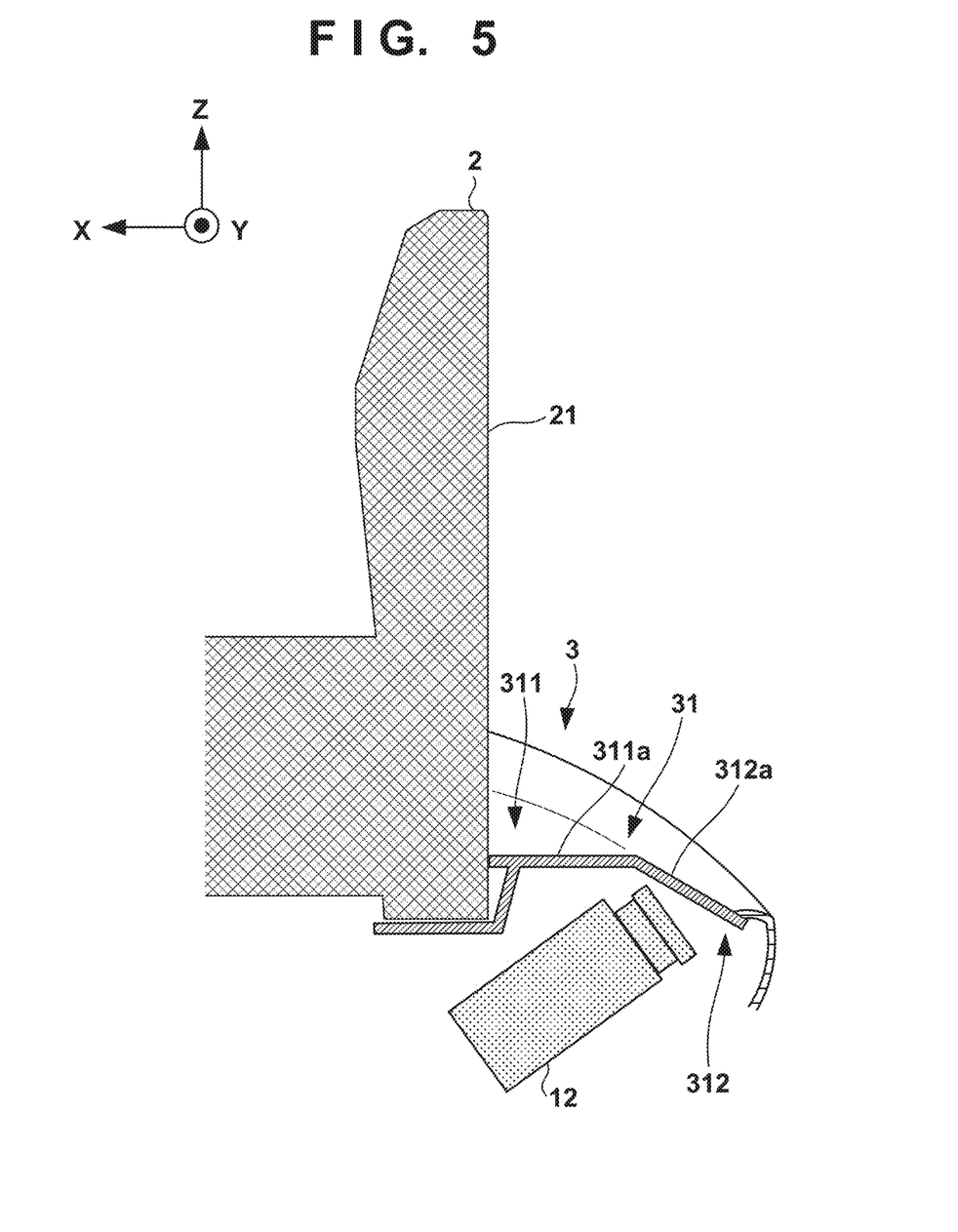
FIG. 5 is a cross-sectional view taken along line I-I in FIG. 2.

FIG. 5 is a cross-sectional view taken along line I-I in FIG. 2. Note that, in FIG. 5, some components are not illustrated to make the figure easily viewable.

As described above, the instrument panel 3 includes the cover portion 31 that covers the imaging device 1. The cover portion 31 is formed of, for example, a resin material. The cover portion 31 includes a front side portion 311 extending rearward from the display screen 21 of the display unit 2 in the front-and-rear direction of the vehicle, and a rear side portion 312 extending at least downward from a rear end of the front side portion 311 at an angle different from that of the front side portion 311. In the present embodiment, the front side portion 311 extends substantially horizontally in the front-and-rear direction, but the front side portion 311 may be inclined upward or downward toward the rear, for example. In addition, in the present embodiment, the rear side portion 312 is inclined downward toward the rear but may form a vertical face.

In the present embodiment, the imaging unit 12 images the occupant through the rear side portion 312. In addition, since the rear side portion 312 is provided to extend at least downward, it is possible to prevent light from the display unit 2 from being reflected by the rear side portion 312 and reaching the occupant.

In addition, in the present embodiment, a surface 311*a* of the front side portion 311 is configured to be rougher than a surface 312*a* of the rear side portion 312. For example, the surface 311*a* may have such roughness that the light from the display unit 2 is diffusely reflected. As a result, it is possible to prevent the light from the display unit 2 from being specularly reflected by the surface 312*a* of the front side portion 311 and reaching the occupant. On the other hand, the surface 312*a* of the rear side portion 312 is configured to have a relatively small roughness. For example, the surface 312*a* may have such roughness that light is transmitted to such an extent that the imaging unit 12 can image the occupant through the rear side portion 312. As a result, the imaging unit 12 can image the occupant through the rear side portion 312. In addition, in the present embodiment, it is possible to install the imaging device 1 in the vehicle interior while suppressing deterioration in appearance by covering the imaging device 1 with the cover portion 31. In one embodiment, the surface 311*a* is configured to be rougher than the surface 312*a* by making the surface 311*a* have irregularities higher than irregularities of the surface 312*a*. For that matter, the surface 311*a* is configured to be rougher than the surface 312*a* by making the irregularities have a height difference equal to or larger than a predetermined value.

The surface 311*a* of the front side portion 311 may be subjected to, for example, a surface treatment such as roughness processing that results in a relatively large roughness causing diffuse reflection of light on the surface. In addition, the surface 312*a* of the rear side portion 312 may be subjected to a surface treatment that results in a relatively small roughness so that at least a part of the light is transmitted through the cover portion 31.

Note that, in the present embodiment, the front side portion 311 and the rear side portion 312 are integrally formed of a single material, and the surface roughness of the surface 311*a* and the surface 312*a* is made to be different by different type of surface treatment, but these may be formed by different members.

Other Embodiments

In the embodiment described above, the optical axis 142*a* of the light emitting portion 142 is directed to the driver seat 4, and the optical axis 144*a* of the light emitting portion 144 is directed to the passenger seat 5. However, the optical axes of all of the plurality of light emitting portions may be directed toward the driver seat 4.

In addition, in the embodiment described above, the imaging device 1 images the occupant seated on the driver seat 4 or the passenger seat 5, but a configuration in which the imaging device 1 images an occupant seated on the rear seat can also be adopted. For example, the imaging device 1 may be attached to the ceiling in the vehicle interior so that the imaging device 1 can image the occupant seated on the rear seat from the front in the vehicle longitudinal direction.

<Summary of Embodiments>

The embodiments described above disclose at least the following vehicle and imaging device.

1. The vehicle (V) of the embodiment described above includes an imaging unit (12) configured to image an occupant from front of the occupant in a vehicle longitudinal direction in a vehicle interior, and a light emitting unit (14) including a first light emitting portion (142) and a second light emitting portion (144) that irradiate an imaging range (12*b*) of the imaging unit, in which an optical axis (142*a*) of irradiation light from the first light emitting portion and an optical axis (144*a*) of irradiation light from the second light emitting portion intersect with each other between the light emitting unit and the occupant in plan view.

According to this embodiment, the irradiation distance at which the irradiation light from the first light emitting portion and the second light emitting portion reaches the occupant becomes long, so that the irradiation range of the light emitting portion can be further increased.

2. According to the embodiment described above, the optical axis of irradiation light from the first light emitting portion is directed to a driver seat (4) of the vehicle, and the optical axis of irradiation light from the second light emitting portion is directed to a passenger seat (5) of the vehicle.

According to this embodiment, the irradiation range of the irradiation light directed to each of the driver seat and the passenger seat can be further increased.

3. According to the embodiment described above, the first light emitting portion is provided at a position farther from the driver seat than the center of the vehicle in the vehicle width direction.

According to this embodiment, the irradiation range of the irradiation light directed to the driver seat can be further increased.

4. According to the embodiment described above, the light emitting unit is provided at a position farther from the driver seat than the imaging unit in the vehicle width direction.

According to this embodiment, the light emitting unit is arranged farther from the driver seat, so that the irradiation range of the irradiation light directed to the driver seat can be increased.

5. According to the embodiment described above, the imaging unit is provided such that a virtual straight line (VC) extending in the front-and-rear direction passes through the center in the vehicle width direction in plan view of the vehicle.

According to this embodiment, the imaging unit is arranged substantially at the center of the vehicle in the vehicle width direction. As a result, the imaging unit can image the occupants in the driver seat and the passenger seat.

6. According to the embodiment described above, an instrument panel (3) provided at a front portion of the vehicle interior is further included, the light emitting unit is provided inside the instrument panel, and a rear end of the light emitting unit is located on a front side with respect to a rear end of the imaging unit in the vehicle longitudinal direction.

According to this embodiment, since the light emitting unit is arranged so as to be accommodated in the panel, it is possible to reliably irradiate the imaging target with the LED while reducing noise from surrounding electrical components.

7. According to the embodiment described above, the instrument panel includes a cover portion (31) covering the imaging unit below the display unit of the vehicle, the cover portion includes a first portion (311) extending in a vehicle longitudinal direction and a second portion (312) extending at least downward from a rear end of the first portion at an angle different from an angle of the first portion, and the imaging unit images the occupant through the second portion.

According to this embodiment, the second portion is provided to extend at least downward, so that it is possible to prevent light from the display unit from being reflected and reaching the occupant.

8. According to the embodiment described above, the surface (311a) of the first portion is rougher than the surface (312a) of the second portion.

According to this embodiment, a surface of the first portion is rough by making the irregularities of the surface of the first portion have a height difference equal to or larger than a predetermined value, so that it is possible to prevent the light from the display unit from being reflected by the first portion and reaching the side of the occupant. In addition, the imaging unit can image the occupant through the second face having relatively small roughness.

9. According to the embodiment described above, the first light emitting portion emits irradiation light each from a plurality of light emitters (1421, 1422, 1423) provided side by side in a direction orthogonal to a direction of the optical axis of the irradiation light from the first light emitting portion, and the second light emitting portion emits irradiation light each from a plurality of light emitters (1441, 1442, 1443) provided side by side in a direction orthogonal to a direction of the optical axis of the irradiation light from the second light emitting portion.

According to this embodiment, a plurality of light emitters is provided, so that it is possible to more reliably irradiate the occupant.

10. According to the embodiment described above, an instrument panel provided at a front portion of the vehicle interior is further included, an operation unit (6) which is provided to protrude rearward in the vehicle longitudinal direction from the instrument panel, and on which a predetermined operation is performed is further included, and the operation unit and the imaging unit are provided side by side in the vehicle width direction such that the operation unit is located closer to the driver seat than the imaging unit.

According to this embodiment, it is possible to prevent the light irradiated on the side of the driver seat from being blocked by the operation unit.

11. An imaging device (1) according to the embodiment described above includes an imaging unit (12) that images an occupant from a front in a vehicle longitudinal direction in a vehicle interior, and a light emitting unit (14) including a first light emitting portion and a second light emitting portion that irradiate an imaging range (12b) of the imaging unit from the front in the vehicle longitudinal direction, in which an optical axis (142a) of irradiation light from the first light emitting portion (142) and an optical axis (142b) of irradiation light from the second light emitting portion intersect with each other between the light emitting unit and the occupant in vehicle plan view.

According to this embodiment, the irradiation distance at which the irradiation light from the first light emitting portion and the second light emitting portion reaches the occupant becomes long, so that the irradiation range of the light emitting portion can be further increased.

The invention is not limited to the foregoing embodiments, and various variations/changes are possible within the spirit of the invention.

What is claimed is:

1. A vehicle comprising:
an imaging unit configured to image an occupant from front of the occupant in a vehicle longitudinal direction in a vehicle interior;
a light emitting unit including a first light emitting portion and a second light emitting portion configured to irradiate an imaging range of the imaging unit; and
an instrument panel provided at a front portion of the vehicle interior, wherein
an optical axis of irradiation light from the first light emitting portion and an optical axis of irradiation light from the second light emitting portion intersect with each other between the light emitting unit and the occupant in plan view,
the light emitting unit is provided inside the instrument panel, a rear end of the light emitting unit is located on a front side with respect to a rear end of the imaging unit in the vehicle longitudinal direction, the instrument panel includes a cover portion covering the imaging unit below a display unit of the vehicle, the cover portion includes a first face extending in the vehicle longitudinal direction and a second face extending at least downward from a rear end of the first face at an angle different from an angle of the first face, and the imaging unit images the occupant through the second face.

2. The vehicle according to claim 1, wherein the optical axis of irradiation light from the first light emitting portion is directed to a driver seat of the vehicle, and the optical axis of irradiation light from the second light emitting portion is directed to a passenger seat of the vehicle.

3. The vehicle according to claim 2, wherein the first light emitting portion is provided at a position farther from the driver seat than a center of the vehicle in a vehicle width direction.

4. The vehicle according to claim 2, wherein the light emitting unit is provided at a position farther from the driver seat than the imaging unit in a vehicle width direction.

5. The vehicle according to claim 4, wherein the imaging unit is provided such that a virtual straight line extending in a front-and-rear direction passes through a center in the vehicle width direction in plan view of the vehicle.

6. The vehicle according to claim 4, further comprising:

an instrument panel provided at a front portion of the vehicle interior; and an operation unit which is provided to protrude rearward in the vehicle longitudinal direction from the instrument panel, and on which a predetermined operation is performed, wherein the operation unit and the imaging unit are provided side by side in the vehicle width direction such that the operation unit is located closer to the driver seat than the imaging unit.

7. The vehicle according to claim 1, wherein a surface of the first face is rougher than a surface of the second face.

8. The vehicle according to claim 1, wherein the first light emitting portion emits irradiation light each from a plurality of light emitters provided side by side in a direction orthogonal to a direction of the optical axis of the irradiation light from the first light emitting portion, and the second light emitting portion emits irradiation light each from a plurality of light emitters provided side by side in a direction orthogonal to a direction of the optical axis of the irradiation light from the second light emitting portion.

9. An imaging device comprising:

an imaging unit configured to image an occupant from a front in a vehicle longitudinal direction in a vehicle interior; and a light emitting unit including a first light emitting portion and a second light emitting portion configured to irradiate an imaging range of the imaging unit from the front in the vehicle longitudinal direction, wherein an optical axis of irradiation light from the first light emitting portion and an optical axis of irradiation light from the second light emitting portion intersect with each other between the light emitting unit and the occupant in vehicle plan view, wherein the vehicle includes an instrument panel provided at a front portion of the vehicle interior, the light emitting unit is provided inside the instrument panel, a rear end of the light emitting unit is located on a front side with respect to a rear end of the imaging unit in the vehicle longitudinal direction, the instrument panel includes a cover portion covering the imaging unit below a display unit of the vehicle, the cover portion includes a first face extending in the vehicle longitudinal direction and a second face extending at least downward from a rear end of the first face at an angle different from an angle of the first face, and the imaging unit images the occupant through the second face.

\* \* \* \* \*